United States Patent
Joels et al.

(10) Patent No.: US 8,230,058 B2
(45) Date of Patent: Jul. 24, 2012

(54) HEALTH REPORTING MECHANISM FOR INTER-NETWORK GATEWAY

(75) Inventors: Jo Ann Joels, Tulsa, OK (US); Martin C. Albright, Dallas, TX (US); Lejla Hadzidedic, Dallas, TX (US); Sandra Elaine Lutovsky, McKinney, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1645 days.

(21) Appl. No.: 10/811,730

(22) Filed: Mar. 29, 2004

(65) Prior Publication Data

US 2005/0216729 A1   Sep. 29, 2005

(51) Int. Cl.
*G06F 15/173* (2006.01)

(52) U.S. Cl. ..................................... 709/224
(58) Field of Classification Search .................. 709/224
See application file for complete search history.

(56) References Cited

U.S. PATENT DOCUMENTS

| | | |
|---|---|---|
| 5,097,469 A | 3/1992 | Douglas |
| 5,546,540 A | 8/1996 | White |
| 5,615,323 A | 3/1997 | Engel et al. |
| 6,115,393 A | 9/2000 | Engel et al. |
| 6,115,743 A | 9/2000 | Cowan et al. |
| 6,192,414 B1 | 2/2001 | Horn |
| 6,216,169 B1 | 4/2001 | Booman et al. |
| 6,278,694 B1 | 8/2001 | Wolf et al. |
| 6,320,585 B1 | 11/2001 | Engel et al. |
| 6,363,411 B1 | 3/2002 | Dugan et al. |
| 6,377,993 B1 | 4/2002 | Brandt et al. |
| 6,470,386 B1 | 10/2002 | Combar et al. |
| 6,473,407 B1 | 10/2002 | Ditmer et al. |
| 6,490,620 B1 | 12/2002 | Ditmer et al. |
| 6,515,968 B1 | 2/2003 | Combar et al. |
| 6,556,659 B1 * | 4/2003 | Bowman-Amuah ......... 379/9.04 |
| 6,571,285 B1 * | 5/2003 | Groath et al. ................. 709/223 |
| 6,598,167 B2 | 7/2003 | Devine et al. |
| 6,606,708 B1 | 8/2003 | Devine et al. |
| 6,615,258 B1 | 9/2003 | Barry et al. |
| 6,631,402 B1 | 10/2003 | Devine et al. |
| 6,697,751 B2 | 2/2004 | Skingsley et al. |
| 7,225,249 B1 * | 5/2007 | Barry et al. .................... 709/227 |
| 2002/0059516 A1 * | 5/2002 | Turtiainen et al. ............ 713/153 |
| 2002/0067742 A1 * | 6/2002 | Or et al. ......................... 370/466 |
| 2003/0058846 A1 * | 3/2003 | Pike et al. ..................... 370/360 |
| 2007/0160201 A1 * | 7/2007 | Blom et al. ..................... 380/30 |
| 2008/0189353 A1 * | 8/2008 | Gray et al. ..................... 709/202 |
| 2009/0245122 A1 * | 10/2009 | Maiocco et al. .............. 370/252 |

OTHER PUBLICATIONS

Huang et al. "A Traffic-Based Method of Detecting Dead IKE peers," RFC 3706. Feb. 2004. (obtained from: http://www.ietf.org/rfc/rfc3706.txt).*

"Netcool®/Visionary TM v2.5—Improve Service Continuity Through Realtime Problem Diagnosis," Micromuse TM Netcool® solutions, Jun. 2003 retrieved from http://web.archive.org/web/20040716035532/http://www.micromuse.com/downloads/pdf_lit/Visionary_v25.pdf.*

(Continued)

*Primary Examiner* — Hussein Elchanti
*Assistant Examiner* — Maceeh Anwari

(57) ABSTRACT

A method of monitoring the stability of a network includes polling an inter-network gateway to collect data related to the inter-network gateway. In one example, the data is related to one or more of a flowcache, a virtual private routed network, or an internet key exchange security association. The data can then be processed to generate a number of parameters and a health report can be generated based on the parameters.

39 Claims, 2 Drawing Sheets

OTHER PUBLICATIONS

"The Netcool (R)/OMNIbus TM System Architecture—White paper," Micromust TM Netcool(R) Solutions, Mar. 2002 retrieved from http://web.archive.org/web/20030307232245/http://www.micromuse.com/downloads/pdf_lit/wps/OMNIbus_wp.pdf.*

Eppich, Robert, "Bridging the Great Divide Between Public and Private Networks," Nov. 2003.

"Netcool®/Precision™ Product Family—Realtime Network Discovery, Asset Discovery, and Fault Management," Micromuse™ Netcool® Solutions, 2003, www.micromuse.com.

"Fault Management, Getting it Right," Asia Computer Weekly, Nov. 5, 2001.

"Integrated Fault Management and Trouble Ticketing, Netcool® OMNIbus™ Gateway for MetaSolv® Trouble Management" Micromuse Netcool® Solutions (date unknown).

"Marconi's Integrated Fault Management Solution, Real-Time Fault Management for Service Providers and Enterprise Networks," Marconi Communications Limited 2002.

PROVISO V3 Data Sheet, 2001, www.quallaby.com.

"The eHealth® Suite for Customer Reporting", "eHealth® for Systems & Applications Management", "eHealth® for Application Performance Management," 2001-2003, www.concord.com.

"MCI Launches Network-Bsed IP VPN Remote Service," Converge Network Digest, Jun. 18, 2003, www.mci.com.

"MCI Launches Industry's First Network-Based IP VPN Remote Service," Computer Security News, Jun. 19, 2003, www.itsecurity.com.

"MCI Secure Interworking Gateway," http://global.mci.com/uk/data/vpn/guide/sig/ printed on Feb. 24, 2004.

* cited by examiner

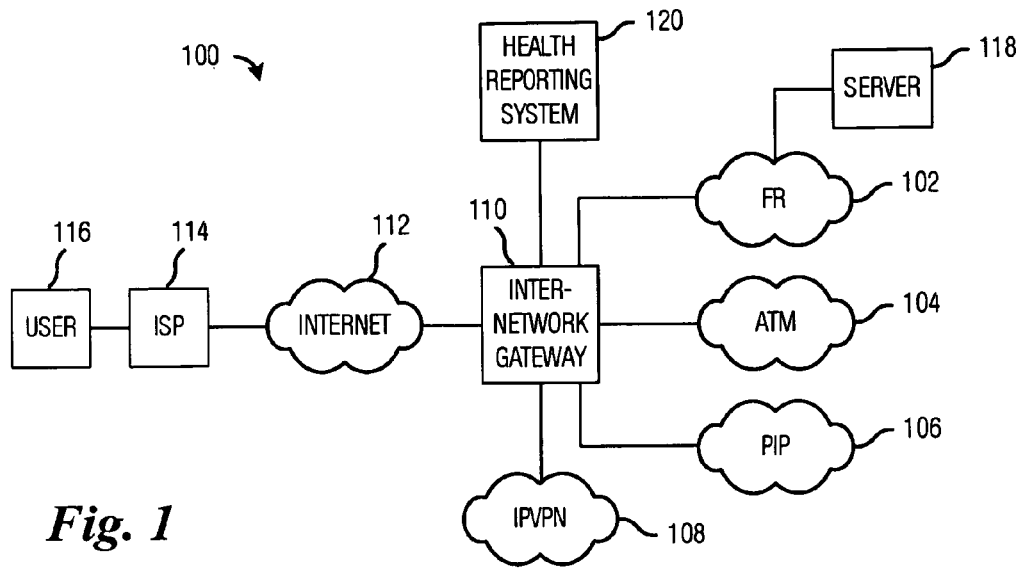
Fig. 1
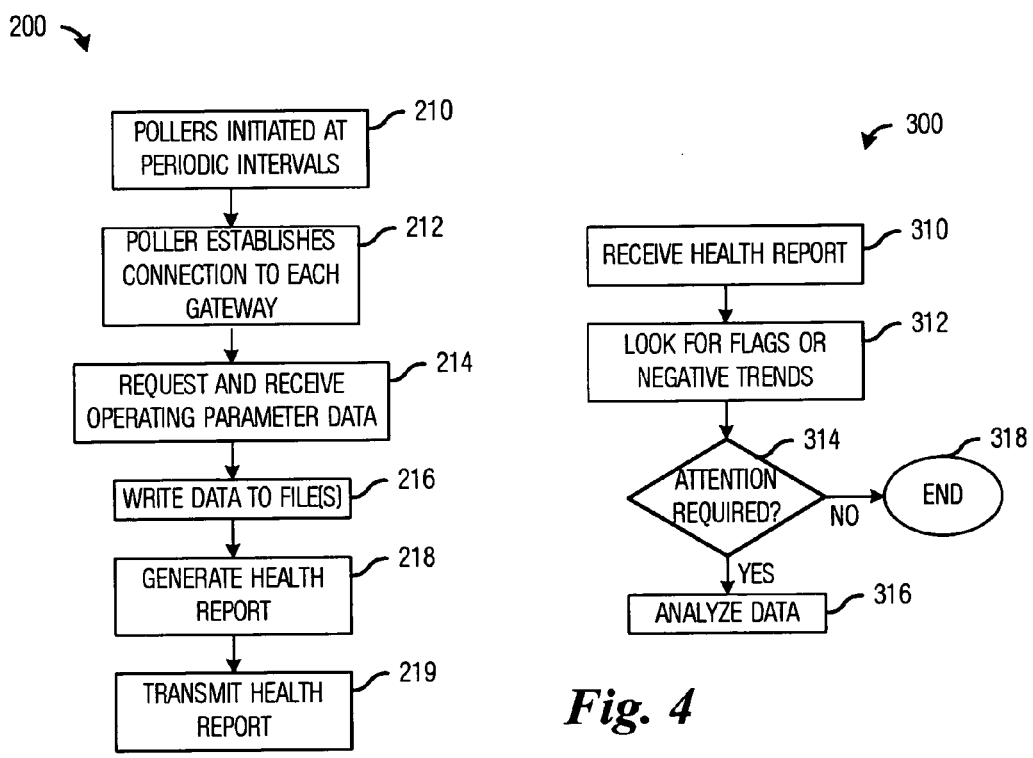
Fig. 3
Fig. 4

HEALTH REPORTING MECHANISM FOR INTER-NETWORK GATEWAY

TECHNICAL FIELD

The present invention relates generally to communication networks, and more particularly to a health reporting mechanism for inter-network gateways.

BACKGROUND

A telecommunications network supports voice and data communications between customers. What is typically viewed as a single network, however, can actually be a series of separate networks, many times owned and operated by different companies. Oftentimes, a "single" data communications network will have portions that utilize different technologies. For example, one part of the network may be based upon frame relay technology while another part of the network is based upon asynchronous transfer mode (ATM) technology. A gateway is a network component that bridges these different portions.

One goal of a telecommunications service entity is to maintain the level of quality of the network. For example, entities presently provide for the presentation and dissemination of customer account and network data management information to their customers by, for example, enabling customers (clients) to connect to the entity's application servers to access their account information. The requests are processed by the entity's application servers, which retrieve the requested customer information from one or more databases, process and format the information for downloading back to the client.

As an example, larger telecommunications inter-exchange carrier enterprises provide management and performance information relating to circuits comprising a customer's broadband network, including web servers as an example. Such network management information generally includes details of network use and performance such as, for instance, real time status and alarm information, near real time performance data, usage statistics, SNMP data, etc. For example, the carrier could provide a system that monitors all aspects of web server health from CPU usage, to memory utilization, to available swap space so that Internet/Intranet networks can increase their hit rate and reduce Web server management costs. Software processes can generate alerts based on process health, connectivity, and availability of resources (e.g., disk usage, CPU utilization, database availability).

Such health reporting mechanisms have been implemented within a particular network. For example, a system has been implemented to generate health reports for a Frame Relay network. The system polled Frame Relay switches to obtain information on parameters such as CPU and memory utilization. This information was analyzed and provided to support staff on a regular basis so that it could be studied for conditions that might lead to a network failure or other instability. Similar health reporting has also been implemented in a Private IP (PIP) network.

SUMMARY OF THE INVENTION

In accordance with a preferred embodiment of the present invention, a method for using a data communications network includes receiving at a gateway device a first communication from a first network that is addressed for a network element of a second network. In this case, the second network is based on a different technology than the first network and the gateway device is a layer 3 gateway. The first communication is then transmitted from the gateway device to the second network. The gateway device also receives a second communication from the second network that is addressed for a network element of the first network. This second communication is transmitted from the gateway device to the first network. The gateway device is also periodically polled to obtain operating parameters related communications between the first and second networks. These operating parameters are analyzed and a health report is generated based upon analysis of the operating parameters. The health report is related to the gateway device(s), and possibly the first network and the second network.

In another aspect, the present invention provides a method of monitoring the stability of a network. An inter-network gateway is periodically polled to collect data related to the inter-network gateway. For example, the data related to at least one of a flowcache, a virtual private routed network, or an internet key exchange security association. The data is processed to generate a number of parameters and a report is generated based on these parameters. The report can then be automatically transmitted, e.g., transmitted without human intervention.

In yet another aspect, the present invention provides a computer program for use in a system for monitoring the stability of a data communications network. The computer program is operable to periodically gather information related to the network and provide a report related to the gathered information. In the preferred embodiment, the computer program includes computer program code for automatically, periodically polling a plurality of inter-network gateways to collect data related to the inter-network gateway, code for processing the data to generate a number of parameters, code for generating a report based on the parameters, and code for automatically transmitting the report.

An advantage of a preferred embodiment of the present invention is that it provides a tool to predict network instabilities by proactively monitoring selected parameters. Network performance reporting tools available on the market today, such as software developed by Quallaby Corporation, CrossKeys Systems Corp. and Concord Communications, Inc., provide information on network availability, latency, and throughput to support customer service level agreements (SLAs). Performance-based tools, however, have been proven to be ineffective as a predictor of events that could result in a network brownout or outage.

Another class of software, network fault management tools, such as NETCOOL™ and NETEXPERT™ report alarms. Alarms are generated when a network element, such as a switch, exceeds a pre-defined threshold. Alarms indicate that a problem exists in the network that requires intervention. As such, it is indicative of a problem that is already occurring.

The health reporting mechanism of the preferred embodiment, on the other hand, detects events and conditions that could lead to future network problems. Frequently, these events and conditions do not generate alarms and would otherwise go undetected until they become service impacting. Comparing these tools to human health, a performance tool would measure the distance and speed of a runner, a fault management tool would detect if he has pulled a muscle, and a health reporting tool would monitor blood pressure, pulse, etc.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a depiction of an inter-network gateway, the networks connected through it, and a health reporting system;

FIG. 3 is a flow diagram of the report generation process; and

FIG. 4 is a flow diagram of the analysis of the report, and disposition of the findings.

DETAILED DESCRIPTION OF ILLUSTRATIVE EMBODIMENTS

Figure 2:
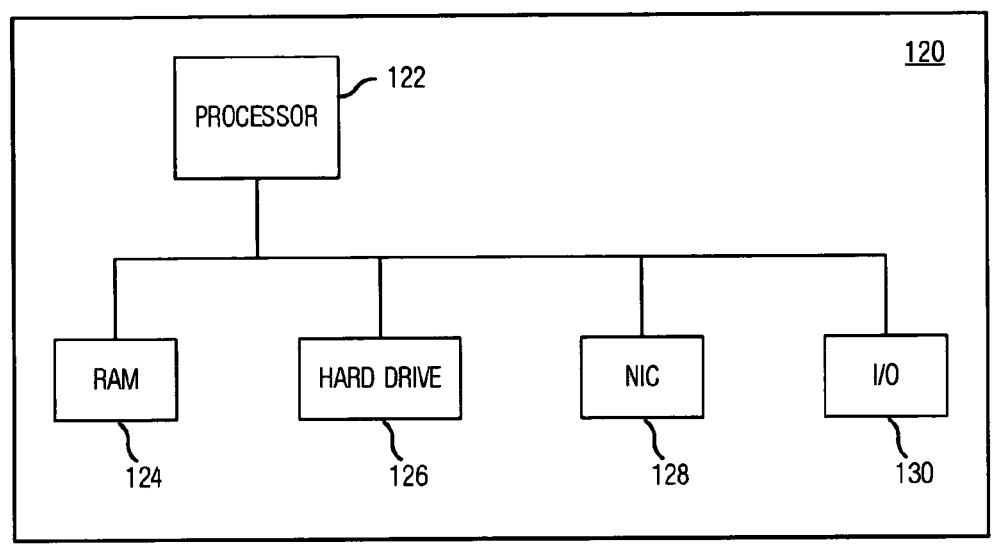
FIG. 2 is a block diagram of one example of the health reporting system of FIG. 1.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a network of gateways that couple data communications networks of different technologies. The invention may also be applied, however, to other networks such as voice networks.

In one aspect, the present invention provides a health reporting mechanism for an inter-network gateway, e.g., a layer 3 gateway. For example, in June 2003 MCI introduced a new network-based service designed to securely and seamlessly connect remote and traveling workers to their existing corporate networks via the Internet. This network, referred to as the Secure Interworking Gateway (SIG), provides enterprises with access to their existing frame relay, ATM, Private IP and IP VPN networks via the Internet. The gateway automatically authenticates the connection, requesting user name and password confirmation from the edge server. Once a user is granted access, communications are routed to a customers' data network via a Permanent Virtual Circuit or an IPSec tunnel.

The preferred embodiment of the present invention provides a health reporting mechanism that can be utilized with a gateway network such as the SIG. In one embodiment, a combination of software scripts (code), reports, processes, and benchmarks allow network engineers to accurately and efficiently assess the health (stability) and performance of any size network. This tool identifies and reports undesirable network conditions that could result in a "brownout" (i.e., significant degradation of performance) or total outage. In one aspect, it is a predictive tool that is designed to spot network problems before they can become service impacting.

Aspects of the present invention are particularly useful with an inter-network based gateway (or a network of such gateways). Accordingly, such a network will be described first including exemplary services that can be provided by the network. A preferred mechanism for monitoring the stability of such a network will then be described.

Referring first to FIG. 1, a data communications network 100 includes a number of network portions 102-106 that can be interconnected by an inter-network gateway 110. Each of the network portions 102-106 utilizes a different technology. For example, network 102 is a frame relay (FR) network, network 104 is an asynchronous transfer mode (ATM) network, network 106 is a private internet protocol (PIP) network, and network 108 is a (internet protocol virtual private network (IPVPN).

While illustrated with a single cloud, each network 102-108 can comprise multiple networks, e.g., from a hardware or a billing perspective. In addition, these four network types are provided as examples. More or less than four types, including these or other networks, can utilize aspects of the present invention. Each network includes a number of network elements, server 118 being provided as an example.

A discussion of a network of the type shown in FIG. 1 is provided in the White Paper by Robert Eppich entitled "Bridging the Great Divide Between Public and Private Networks," Nov. 2003, which paper is available at http://global.mci.com/us/enterprise/insight/whitepapers/pdf/SIG.pdf and which is incorporated herein by reference.

Network portion 102 is a frame relay network. Frame relay technology is based on the concept of virtual circuits (VCs). VCs are two-way, software-defined data paths between two ports that act as private line replacements in the network. Permanent virtual circuits, or PVCs, are set up by a network operator via a network management system. PVCs are initially defined as a connection between two sites or endpoints. New PVCs may be added when there is demand for new sites, additional bandwidth, alternate routing, or when new applications require existing ports to talk to one another.

Frame relay is a synchronous protocol where data is carried across a communications line in frames that are similar in structure. In a frame relay frame, user data packets are not changed in any way. Frame relay simply adds a two-byte header to the frame. The frame relay header contains a 10-bit number called the Data Link Connection Identifier (DLCI). The DLCI is the frame relay VC number (with local significance), which corresponds to a particular destination. The frame relay switches utilize routing algorithms such as open shortest path first (OSPF) to determine the optimal path for the PVCs. The DLCI addresses are used by the intermediate frame relay switches to uniquely identify the PVCs and determine the optimal path.

ATM technology can be used in the portion 104 of communications network 100. Asynchronous Transfer Mode technology (ATM) is also a layer 2 networking technology based on the concept of using VCs that are set up by a network operator. Unlike frame relay's variable-length packets, the ATM protocol uses fixed-length packets (cells) to transport user data across the network. It is the use of these fixed-length cells that allows ATM to support a range of applications and traffic types. Cells are statistically multiplexed and network capacity is dynamically allocated based on the real-time needs of the applications supported. These cells consist of 48 bytes of data payload and a five-byte header containing the addressing information required for information delivery. This header contains Virtual Path Identifier (VPI) and Virtual Channel Identifier (VCI) addressing information performing a similar function to the frame relay DLCI.

Private IP service, as shown by cloud 106, is based on multi-protocol label switching (MPLS) technology. MPLS enables networks to take advantage of the best of IP, ATM, and frame relay by allowing the integration of layer 2 switching (ATM and frame relay, for example) and layer 3 routing (IP). The MPLS signaling protocols support and create labels required to move the traffic across the network. The labels identify the end-address destinations of the network traffic as well as quality of service (QoS) information for the prioritization of traffic across the network. The QoS information is initially applied by the CPE router to the Type of Service (TOS) byte of the IP packets and this information is copied into the MPLS labels by the provider MPLS switches. This QoS capability allows for the transmission of both real-time applications such as voice and video along with data traffic across the same network infrastructure.

MPLS-enabled Private IP networking offers full IP routing capabilities at the edge of the network. The customer premises equipment (CPE) peers with the MPLS-enabled switch, and IP routes are exchanged using static routes, RIPv2, EBGP, or OSPF. A virtual router is defined in the software of the MPLS-enabled switch, which is unique to the customer, and the customer CPE peers with this virtual router using a layer 2 encapsulation protocol. IP data is encapsulated by the CPE in layer 2 ATM or frame relay for transport to the MPLS-enabled core. At the MPLS switch, the layer 2 encapsulation is stripped and the layer 3 IP packed is used to make routing decisions. Based upon the destination IP address, this MPLS-enabled switch knows where the packet will leave the switched network and uses that as its target destination. Each IP packet is then encapsulated in an MPLS header and all further switching within the backbone network is performed based on label swapping. In the final MPLS-enabled switch, an IP lookup determines the outbound port destination of the packet, the MPLS labels are removed, and the IP packet is once again encapsulated in ATM or frame relay for delivery to the destination node.

Private IP service utilizes frame relay and ATM PVCs for access into the MPLS-based core network. This allows for a simple migration from an existing frame relay or ATM network. These PVCs peer with the edge MPLS switch and not the destination router; frame relay and ATM is simply used as transport mechanism to the MPLS edge router. Additional benefits include inherent any-to-any connectivity, class of service offerings, and seamless inter-working between frame relay and ATM similar to FRASI described earlier.

While layer 2 communication is handled from location to location via a PVC, Internet protocol (IP) requires each device connected to the Internet to be identified by a unique number, the IP address. Since there is no permanent circuit required for locations and devices to communicate with one another, this allows for a connectionless network. It is this connectionless-oriented network that has allowed for the rapid availability of the Web and its associated solutions. The Internet 112 is the largest public network, as it is a culmination of many service providers' facilities connected in a hierarchical fashion. Anyone can freely participate in this network as long as they register themselves with a unique IP address. One concern with using this infrastructure is the lack of security; again it is open to anyone in the world. Security measures have been developed to allow for secure transmission across this architecture which involve the encryption of the data prior to transmission across secure "tunnels" and the subsequent decryption upon data receipt. IP VPN 108 can be thought of as a "network" based on these tunnels.

Tunneling refers to the creation of a secure temporary path over an inherently unsecured network such as the aforementioned public Internet. While there are a number of tunneling protocols (L2TP, PPTP, L2F), the most prevalent in VPN deployments is the layer 3 tunneling protocol suite, IPSec. The IPSec protocol suite enables authentication, confidentiality, and integrity between systems. Here it is important to point out that IPSec does not authenticate users, but authenticates devices. The IPSec tunneling process is established in three phases; determine whether IP communications require IPSec, negotiate and then establish the secure communications, and transmit the data.

The IPSec protocol suite can provide for data origin authentication, anti-replay, integrity, and confidentiality. Most implementations of IPSec accomplish this using Internet Key Exchange (IKE) and Encapsulating Security Protocol (ESP). A prerequisite to an IP packet being secured by IPSec is that a Security Association (SA) must exist. This SA may be created manually or dynamically. IKE is used to create them dynamically on behalf of IPSec and requires that the IPSec peers first authenticate themselves to each other and then establish a shared key for encrypting and decrypting data. Once an SA is established, ESP is used to perform the data authentication, antireplay, integrity, and confidentiality. It does so by using a combination of cipher and authentication algorithms and then inserting a protocol header into the IP datagram that provides the information required to perform theses functions.

The other network illustrated in FIG. 1 is the public Internet 112. In the illustrated embodiment, the public Internet 112 denotes the worldwide collection of interconnected networks that uses Internet Protocol to link the large number of physical networks into a single logical network. Physically, the Internet is a huge, global network spanning countries around the world and comprising a great number of academic, commercial, government, and military networks.

Inter-network gateway 110 is provided to allow communications (interworking) between each of the network portions 102-108. Inter-working allows users to share information privately and securely across a variety of physical network topologies. Gateways 110 are responsible for logical connection termination, authentication, security, and protocol conversion. One example of a gateway 110 is the Shasta broadband service node (BSN) available from Nortel Networks.

In the preferred embodiment, the gateway 110 is a layer 3 gateway. In other words, the gateway routes data from one network to another based on the layer 3 address, regardless of the arbitrary layer 2 encapsulations at the edges of the individual networks. This device can be distinguished from a network-to-network interface (NNI) that splices connections between edges of different networks of the same layer 2 technology (e.g., frame relay or ATM) and from trunks that transfer data within the core of a single network during long haul communications.

In the preferred embodiment, the gateway 110 has user-to-network (UNI) links to frame relay and ATM networks 102 and 104 for PVCs to the customer's private frame relay, ATM, or Private IP WAN network. The gateway PVC endpoint terminates on a static virtual interface configured on the customer's VPRN (virtual private routed network). The other PVC endpoint terminates on a router on the customer's enterprise network, or in the case of PIP, on the customer's virtual router. These point-to-point links appear as static subscribers to the VPRN. As an example, they can be configured as IP.252 subnets (/30) and can run RIPv2 or carry static routes for reachability to the customer's WAN and beyond. IP VPN Dedicated networks are connected to their configured VPRNs by virtual interfaces terminating IPSec tunnels through the IP trunks.

The VPRN functions as a conventional IP router, with awareness only of the data arriving over the active virtual interfaces, so that there is no constraint on the customer's IP addressing plan. It builds a route table with static and/or dynamically generated routes, and forwards datagrams to the virtual interface indicated by the route table. In this way, traffic can be routed between many remote clients and destinations on the enterprise network.

The inter-network gateway 10 allows the service provider to provide a number of services between network portions 102-108 and the public Internet 112. For example, remote access occurs when a remote user 116 connects to a server 118 via the Internet 112. An example of remote access occur when a corporate employee wants to connect to the company's internal network while traveling or working from home.

To activate remote access, the user 116 launches a connection to the Internet 112, e.g., through an Internet service provider 114, and communications from the user would be routed to the gateway 110, which has a trunk to the Internet. The gateway 110 will authenticate the user 116 and create a bridge between the access device 116 and the corporate network 118. In this respect, the gateway 110 is generic on the access side, since it can connect to the Internet, and can have proprietary connections on the private side. These connections allow communication with any portion of the network 100 regardless of the underlying technology.

In a practical application, the gateway 110 is implemented as a network of gateways. For example, the gateway 110 may include many (e.g., 10-100) physical boxes that can be located at numerous places throughout the network, within the country and around the world. In some instances, the gateway 10 will be located in the same physical location or terminal as the frame relay 102 or ATM 104 equipment. Due at least to the Internet connection, the device 110 is logically reachable from anywhere in the world.

The gateway 110 enables a network-based remote access solution by serving as a concentrator switch that is a shared device hosted in the provider's network. As noted above, this shared device 110 includes multiple virtual routers and each customer 118 is provisioned to a unique virtual router through their private network connection. Access to this shared switch 110 is limited to the provider and security policies are implemented to ensure that privacy is maintained between all customers. This feature is attractive to customers with existing private network infrastructures that do not want to procure secondary connectivity directly into the public Internet. Since the provider manages the network-based gateway 110, the customer can extend a PVC or dedicated IPSec tunnel from their host site across their existing private infrastructure into this network gateway 110. This private connection terminates onto a virtual router in the network-based gateway assigned exclusively to that customer.

The customer's virtual router also has connectivity into the public Internet 112. With this service, the customer purchases a PVC into the gateway 110 as opposed to purchasing an additional Internet connection and concentrator equipment as would occur in a CPE-based remote access solution. This is the optimal low-cost solution for customers with existing private network connectivity and sufficient available bandwidth at their host port to support the additional dial user traffic by extending a PVC or IPSec tunnel to a virtual router in the network-based virtual gateway.

Another feature that is provided by the gateway 110 is a firewall. The firewall features within the gateway 110 will intercept packets to verify conformance to a rule set before forwarding is allowed. This task can be accomplished without additional physical connections. The firewall solution can be advantageous since the customer 118 would not be required to purchase a firewall at the customer premise. Rather, the provider builds the PVC into a network-based firewall, which is hosted and managed within the provider's resilient network 100. The network provider is then responsible for the management and maintenance of the hardware and software. Preferably, the customer will have the ability to access the firewall via a secure GUI in order to manage and set policies for their particular security requirements.

When operating a network 100 it is important to avoid network crashes. One method to accomplish this goal is to have a system in place to monitor and report on significant network parameters and statistics. One goal of this system is to anticipate network instabilities so that they can be corrected before the network performance is adversely affected.

Accordingly, a health reporting system can be used to gather, analyze and distribute information about events and conditions in the network 100 that may affect network stability and performance. The health report can be transmitted (e.g., e-mailed) daily to network engineering and operational support staff with responsibility for ensuring the health and performance of the network. With this information, the staff can then make informed judgments and take proactive steps to avoid or reverse complications, in the same way that a doctor would respond to a report that a patient has high blood pressure or cholesterol.

In one embodiment, the report contains information about network events such as card toggles, and about network statistics such as CPU and memory utilization for the numerous processors, and counts of significant logical objects such as connections, VPNs, and IPSec tunnels. It provides comparative benchmarks for a similar "healthy" network.

The health reporting can be accomplished by a computer system 120 that is connected to the gateway 110 through a control network (not explicitly shown) or through any of the networks 102-108 or 112. The particular configuration shown in FIG. 1 is merely exemplary of one particular configuration. In one example, the computer system 120 can be a PC running software that polls the gateway to gather specified information and then analyzes this information. This computer can be implemented as a single box or can be implemented over a number of distributed machines, each machine performing a portion of the tasks.

FIG. 2 illustrates an example of a computer system 120 that can be used to implement the health reporting mechanism described herein. In this example, the system 120 includes a processor 120, which runs the software that implements the health reporting mechanism. Further detail regarding the software is provided in the flowchart of FIG. 3. In the preferred embodiment, the processor is a microprocessor, e.g., a Pentium™ class chip available from Intel, an Athlon™ class chip available from Advanced Micro Devices, a Sparc™ class chip available from Sun Microsystems, or the like. In other embodiments, other controllers or processing units can be used.

A number of components are shown attached to the processor 122. For example, random access memory (RAM) 124 can be used to store the program code and working data for the processor. This memory is preferably implemented with a dynamic random access memory (DRAM) in combination with a faster cache memory, e.g., implemented through static random access memory (SRAM) technology. Other memories, such as electrically erasable programmable read only memories, can alternatively be used.

Long term memory 126 is used to store program code, and possibly other information, while the computer is not being used. As such, memory 126 is preferably a non-volatile memory. In the preferred embodiment, memory 126 is a hard disk drive. In other embodiment, memory 126 can be implemented with an optical drive (e.g., CD-ROM, or DVD), flash memory (or other non-volatile semiconductor memory), or floppy disk drive. Combinations of the various types of memory could also be used. The memory 126 could be eliminated if program code and operating system are accessed through the NIC 128.

Network interface card (NIC) 128 is used to provide a connection to elements outside the system 120. In FIG. 1, the system 120 is shown with a connection to the gateway 110. This connection could be made through a NIC 128. In the case where the system 120 is distributed over a number of separate boxes, each box might also have a NIC 128 to facilitate communications.

Finally, input/output (I/O) block 130 is provided to show that information must be entered into and received out of the system 120. For example, the input portion could include a keyboard and a mouse while the output portion includes a display and a printer. As with the hard drive, the I/O block 130 could be eliminated if all user communications with the system 120 are performed through the NIC 128.

FIG. 3 provides a flow chart 200 showing the operation of a preferred embodiment of the present invention. The analysis system (not shown) communicates with inter-network gateways 110 via an Internal Data Network (not shown) that is used for network management and which is not accessible to customers. As discussed above, the inter-network gateway 110 typically comprises a number of gateway devices, each of which will be polled by the system. Information gathered from the gateways 110 will then be stored, analyzed and summarized in a health report that can be provided to maintenance staff. The functions of the system will be described with respect to FIG. 3 and the functions of the staff will be described with respect to FIG. 4.

Referring now to FIG. 3, a poller is initiated at periodic intervals as shown by block 210. This initiation is preferably automated, i.e., it begins periodically without human intervention. In the preferred embodiment, the system comprises computer software operating on a UNIX™ operating system and the poller is a software application. In particular, the poller is initiated using a CRON utility. It is understood, however, that any periodic processor can be implemented to automatically run the process at specified intervals.

In the preferred embodiment, not all operating parameters are gathered at the same intervals. For example, some parameters are gathered every fifteen minutes, others every hour and yet others once a day. These time intervals can vary depending upon the specific network and the information that needs to be analyzed.

Referring now to block 212, the poller establishes a connection to each gateway 110 in the network 100. For example, this connection can be established using SNMP (Simple Network Management Protocol) or CLI (Command Line Interface). After a connection is established, operating parameter data is requested by the poller and transmitted from each gateway, as indicated by block 214. In one embodiment, a connection is established with each gateway and information is gathered from that gateway before the next gateway is contacted. In another embodiment, connections are open with multiple gateways at the same time.

Once the data has been received, it is written to a raw data file as indicated by block 216. In the preferred embodiment, two files are generated. A first file includes the raw data as received from the gateways. The second file is a summary file that can be updated after each polling interval in the reporting period. After each reporting period, a new summary file can be created. In addition, multiple summary files can be created for different but overlapping reporting periods.

At the end of each reporting period, the data is analyzed to create a health report. This step is shown in block 218. For example, the reporting period can be daily so that a script is set up to automatically operate at a particular time (e.g., midnight GMT). The health report includes a summary of the information gathered from the operating parameter data. Further details on the health reports are provided below.

As indicated by step 219, the health report can be generated as a file and transmitted to recipients. In the preferred embodiment, the health report is formatted in ASCII text and automatically mailed using a UNIX™ mail utility, which sends the report to a preconfigured list of recipients. The recipients are typically network maintenance and support staff who have the responsibility of monitoring the stability of the network so that failures can be avoided.

FIG. 4 provides a flowchart 300 that illustrates the process from the perspective of the support staff. The health report is received, as indicated by block 310. This report is preferably received via e-mail on a daily basis. Due to the global nature of many networks, different staff will receive the same report at different times depending upon their location (e.g., time zone).

In an alternate embodiment, the system can generate multiple health reports that cover overlapping time periods. For example, staff in Tokyo can receive a report at 6 am local time. Nine hours later, an updated report can be generated and sent to staff in London, where it is 6 am local time. Eight hours later, yet another updated report can be generated and sent to staff in Los Angeles, where it is now 6 am local time. Each updated reports can, but does not need to be, sent to staff worldwide. The number of updates within a reporting period can vary but a typical case would include between two and four updates (e.g., every 6 to 12 hours).

As indicated by block 312, the staff will review the report to check for flags. As will be discussed below, the reporting system can be programmed to compare the operating parameters to thresholds determined from a stable network. A flag (or flags) will be automatically generated when any of the parameters is outside this predetermined threshold.

Another feature supported by the system is trend analysis. Certain items may appear to be operating appropriately in any given chart but negative trends can be determined by monitoring changes over time. Accordingly, some of the parameters can be saved daily, monthly or yearly to view trends.

Based on the report, the staff can determine if attention is required, as indicated by block 314. If no attention is required, the report can be archived and the process is complete for the reporting period (block 318). If attention is required, the data stored in the raw data and summary files can be consulted. Based on this data, the cause of the potential instability can be determined and appropriate corrective action be taken. In this manner, instabilities are predicted and corrected before adversely affecting the network.

Examples of the specific parameters that can be monitored will now be described. Tables 1 provides example of a health reports that can be generated to monitor the stability of the gateway 110. This health report focuses on a number of parameters. Each parameter will be discussed in turn.

TABLE 1

SECURE INTERWORKING GATEWAY (SIG) NETWORK DAILY
HEALTH REPORT
Report For: March xx, 2004
All times reported are in GMT.

| | | DEAD IKE SAs | | |
| --- | --- | --- | --- | --- |
| LOCATION | NODE | TOTAL IKE SAs | DEAD IKE SAs | % DEAD IKE SAs |
| Tokyo | tkyxbsnz | x | x | x.x |
| Manhattan | mnhtsbsnd | x | x | x.x |
| Richardson | rcdsdgtwp | x | x | x.x |

TABLE 1-continued

SECURE INTERWORKING GATEWAY (SIG) NETWORK DAILY HEALTH REPORT
Report For: March xx, 2004
All times reported are in GMT.

NODE THROUGHPUT

| | |
|---|---|
| Total Remote Access Customers: | xx |
| Total Nodes: | x |
| Total Bytes Received: | xxxxxx Kbytes/day |
| Total Bytes Sent: | xxxxxx Kbytes/day |

| LOCATION | NODE | RECEIVED KBYTES | SENT KBYTES |
|---|---|---|---|
| Tokyo | tkyxbsnz | xxxx | xxxx |
| Manhattan | mnhtsbsnd | xxxxxx | xxxxxx |
| Richardson | rcdsdgtwp | xxxxx | xxxxx |

NODE CONFIGURATION

| | |
|---|---|
| Total number of NODES: | x |
| Limits: | MAX VPRNs: xxxx |
| | MAX CONNECTIONS PER SSC: xxxx |
| | MAX IPSEC PER SSC: xxxx |
| Chassis Thresholds: | VPRN WARN: xx% |
| | VPRN AUGMENT: xx% |
| | CONNECTIONS WARN: xx% |
| | CONNECTIONS AUGMENT: xx% |
| | IPSEC WARN: xx% |
| | IPSEC AUGMENT: xx% |
| Total number of Nodes with any value above its threshold: | x |
| FLAG NOTES: | ! = value over a threshold |
| | WARN = Warning - getting close to limit |
| | AUG = Node needs augmenting |

| LOCATION | NODE | NUMBER OF | | | IPSEC | | FLAG |
| | | VPRNs | CONNs | SSCs | MAX | AVG | |
|---|---|---|---|---|---|---|---|
| Tokyo | tkyxbsnz | xx | xx | x | x | x.x | |
| Manhattan | mnhtsbsnd | xx | xxx | x | xx | x.x | |
| Richardson | rcdsdgtwp | x | x | x | x | x.x | |

CMC ( Control and Management Card ) TOGGLES

Total Number of CMC toggles: x

SFC ( Switch Fabric Card ) TOGGLES

Total Number of SFC toggles: x

CMC CPU UTILIZATION

| | |
|---|---|
| Average of all Peak CMC CPU Utilizations: | x.xx% |
| Peak CMC Px Utilization: | x.xx% in Manhattan on mnhtsbsnd.xx at xx:xx |
| Peak CMC Px Utilization: | x.xx% in Tokyo on tkyxbsnz.xx at xx:xx |
| CMC CPU Utilization Threshold: | xx% |
| Number of nodes with either utilization over threshold: | x |

| LOCATION | SWITCH | PEAK % CMC Px UTIL | AVG % CMC Px UTIL | PEAK % CMC Px UTIL | AVG % CMC Px UTIL | FLAG |
|---|---|---|---|---|---|---|
| Tokyo | tkyxbsnz | x.xx | x.xx | x.xx | x.xx | |
| Manhattan | mnhtsbsnd | x.xx | x.xx | x.xx | x.xx | |
| Richardson | rcdsdgtwp | x.xx | x.xx | x.xx | x.xx | |

TABLE 1-continued

SECURE INTERWORKING GATEWAY (SIG) NETWORK DAILY HEALTH REPORT
Report For: March xx, 2004
All times reported are in GMT.

CMC MEMORY UTILIZATION

| | |
|---|---|
| Average of all Peak CMC Memory Utilizations: | xx.xx% |
| Peak CMC Memory Utilization: | xx.xx% in Manhattan on mnhtsbsnd at xx:xx |
| CMC Memory Utilization Threshold: | xx% |
| Number of nodes with utilization over threshold: | x |

| LOCATION | SWITCH | PEAK % CMC MEM UTIL | AVG % CMC MEM UTIL | FLAG |
|---|---|---|---|---|
| Tokyo | tkyxbsnz | xx.xx | xx.xx | |
| Manhattan | mnhtsbsnd | xx.xx | xx.xx | |
| Richardson | rcdsdgtwp | xx.xx | xx.xx | |

SSC ( Subscriber Services Card ) RESETS

Total Number of card resets: x

NO STANDBY CMC

Total switches without a standby CMC: x

NO STANDBY SFC

Total switches without a standby SFC: x

SSPx (Subscriber Services Processor) UTILIZATION

| | |
|---|---|
| Average of all Peak SSPx CPU Utilizations: | xx.xx% |
| Peak SSPx CPU Util: | xx.xx% in Tokyo on tkyxbsnz.x.x.x at xx:xx |
| Average of all Peak SSPx Memory Utilizations: | x.xx% |
| Peak SSPx Memory Util: | x.xx% in on at : |
| Limits: | SSPx FIBs: xxx |
| | SSPx CONNECTIONs: xxx |
| Thresholds: | SSPx CPU Utilization Threshold: xx% |
| | SSPx Memory Threshold: xx% |
| | SSPx FIB Threshold: xx% |
| | SSPx Connection Threshold: xx% |

| LOCATION | NODE.SSC.SSM.SSP | MAX % UTIL CPU | MAX % UTIL MEMORY | MAX # OF FIBs | MAX # OF CONNs | FLAG |
|---|---|---|---|---|---|---|
| Tokyo | tkyxbsnz.x.x.x | xx | x | x | x | |
| Tokyo | tkyxbsnz.x.x.x | xx | x | x | x | |
| Tokyo | tkyxbsnz.x.x.x | xx | x | x | x | |
| Tokyo | tkyxbsnz.x.x.x | xx | x | x | x | |
| Tokyo | tkyxbsnz.x.x.x | xx | x | x | x | |
| Tokyo | tkyxbsnz.x.x.x | xx | x | x | x | |
| Tokyo | tkyxbsnz.x.x.x | xx | x | x | x | |
| Tokyo | tkyxbsnz.x.x.x | xx | x | x | x | |
| Manhattan | mnhtsbsnd.x.x.x | xx | x | x | x | |
| Manhattan | mnhtsbsnd.x.x.x | xx | x | x | x | |
| Manhattan | mnhtsbsnd.x.x.x | xx | x | x | x | |
| Manhattan | mnhtsbsnd.x.x.x | xx | x | x | x | |
| Manhattan | mnhtsbsnd.x.x.x | xx | x | x | x | |
| Manhattan | mnhtsbsnd.x.x.x | xx | x | x | x | |
| Manhattan | mnhtsbsnd.x.x.x | xx | x | x | x | |
| Richardson | rcdsdgtwp.x.x.x | xx | x | x | x | |
| Richardson | rcdsdgtwp.x.x.x | xx | x | x | x | |
| Richardson | rcdsdgtwp.x.x.x | xx | x | x | x | |
| Richardson | rcdsdgtwp.x.x.x | xx | x | x | x | |
| Richardson | rcdsdgtwp.x.x.x | xx | x | x | x | |
| Richardson | rcdsdgtwp.x.x.x | xx | x | x | x | |
| Richardson | rcdsdgtwp.x.x.x | xx | x | x | x | |

The first entry in the health report relates to dead IKE SAs. IKE SA stands for Internet Key Exchange Security Association, an object that is created when an IPSec tunnel is established. The gateway 110 has been known to fail to clean up IKE SAs when IPSec tunnels are disconnected, resulting in an accumulation of these objects. IKE SAs can be counted, and active tunnels can be counted, and the difference is reported as Dead IKE SAs. An incrementing count serves notice that the disconnect process is not functioning properly, so that maintenance activity can be scheduled.

The next entries relate to node throughput and node configuration. The node throughput measures the amount of traffic through each node. The VPRN identifier contains a unique name for each customer and service. From a list of all VPRNs these unique names are counted to provide the number of customers for a particular service. This list includes internal and external, billable and non-billable customers. The number of nodes is derived from a manually maintained list. Received and Sent KBytes are totaled for all trunk and access interfaces, and include externally received packets, internally generated packets, signaling packets and test packets.

Node level limits exist for NUMBER OF VPRNs, NUMBER OF CONNs and MAX IPSEC. In this context, VPRN stands for Virtual Private Routed Network, the term used by Nortel for a VPN (Virtual Private Network), as well as for a Virtual Router. In this section, VPRN refers to a Virtual Router in a particular gateway. CONNs stand for Connections, the generic attachments to the gateway. Connections comprise PVCs, trunks, and IPSec Tunnels. There is a higher limit for Connections than for IPSec tunnels.

For VPRNs the node level limit is stated directly. For NUMBER OF CONNs and MAX IPSEC, the stated per SSC (subscriber service card) limit is multiplied by the number of SSCs to determine the Node limit. Two thresholds are stated as a percentage of the Node limit: WARN and AUGMENT. Any metric exceeding the WARN threshold will be flagged (!) after the reported value, and the FLAG field will read WARN, indicating that the metric or metrics should be monitored carefully. Any metric that also exceeds the AUG threshold changes the FLAG field to read AUG, indicating that capacity should be augmented.

The next entries in the report relate to CMC (control and management card) and SFC (switch fabric card) toggles. In each gateway there is an active and a standby CMC. If the active CMC becomes inactive for any reason causing the standby CMC to assume the active role, a Toggle is said to have occurred. The Number of CMC Toggles is a count of BSNs that have experienced one or more CMC toggles in the reporting period.

In each gateway there is also an active and a standby SFC. If the active SFC becomes inactive for any reason causing the standby SFC to assume the active role, a Toggle is said to have occurred. The Number of SFC Toggles is a count of BSNs that have experienced one or more SFC toggles in the reporting period.

The CMC CPU utilization section provides a summary of the utilization percentages of the two processors on the CMC, responsible for system wide routing protocols, FIB (forwarding information base) generation, and system configuration and management functions. The highest utilization is reported as Peak, along with the average of all the samples. A flag is set if any utilization exceeds the listed threshold.

CMC memory utilization is also monitored and reported. Memory is a critical system resource on the Control and Management Card (CMC), which performs all the routing functions in the system, including routing protocol messaging, creation of Routing Information Bases (RIBs) for all the Virtual Routers, and the creation and distribution of Forwarding Information Bases (FIBs) to the SSCs (Subscriber Services Cards). The CMCs do not forward traffic, so this memory does not comprise buffers, but is the resource for total route capacity in the System. Utilizations over the listed threshold are flagged.

The number of gateways that have experienced one or more resets on one or more of the SSCs in the chassis during the reporting period is tracked in the section entitled SSC card reset. Likewise, the number of gateways that do not have a functional standby CMC is reported in the No Standby CMC section and the number of BSNs that do not have a functional standby SFC is reported in the No Standby SFC section.

The next section in the health report relates to SSP4 (Subscriber Services Processor) utilization. The Subscriber Services Card (SSC) does the forwarding for the gateway. Each SSC has four SSMs (Subscriber Services Modules), and each SSM in turn has four SSPs (Subscriber Services Processors). There are four SSP4s per SSC. One of these SSPs, the SSP4, is the CPU that processes IPSec tunnels. Since most Remote Access connections are IPSec, SSP4 Utilization is a direct measure of gateway system forwarding capacity. For each SSP4 in the gateway, this section reports Max CPU Utilization %, Max Memory Utilization %, Max FIB count, and Max Connection count. A FIB is a Forwarding Information Base, the forwarding table, one per Virtual Router. The individual SSP4s are identified by <switchname>.<slot>. <module>.4. For all values, the peak readings during the reporting period are shown. A flag is set if any of the values exceeds the stated threshold.

Another parameter that should be monitored relates to flowcache. The flowcache is a specialized piece of memory that is used to store current connection details. The most elementary of these is a flow, which is a unique 5-tuple of Source IP Address, Source Port Number, Destination IP Address, Destination Port Number, and Protocol. When the cache contains two such flows for the same Protocol, such that the Source IP Address and Source Port Number of the first flow are the same as the Destination IP Address and Destination Port Number of the second flow, and the Destination IP Address and Destination Port Number of the first flow are the same as the Source IP Address and Source Port Number of the second flow, these two flows are logically grouped together within the flowcache and categorized as a 'connection'. Similarly, when multiple connections exist in support of a single higher layer protocol, (HTTP, SIP, Real Audio, etc.), they are logically grouped together within the flowcache to form a 'conversation'. The flowcache has a number of uses. Gateway services and policies applied to packets associated with connections and conversations typically vary. The first time a packet associated with a particular connection or conversation is forwarded, the service and policy list is looked up and stored in the flowcache. From that point onward, successive packets associated with the same connection or conversation are processed with the associated service and policy list in the flowcache, as long as the connection or conversation is active. This eliminates the need to look up the service and policy list for every packet that is forwarded, resulting in significant CPU cycle savings.

Another use of the flowcache is for state-aware firewall packet filtering. For example, flows originating from the secure side of the firewall outbound can be allowed, but flows originating from the non-secure side of the firewall inbound can be disallowed, unless such an inbound flow can be associated with an outbound flow to form a connection, in which case it is allowed, being a response to a connection initiated from the secure side of the firewall. Once this connection is cached, packets associated with it can flow both inbound and outbound, as long as the connection is active. Once the connection is inactivated, inbound packets with the same 5-tuple are no longer allowed to pass through the 'pin hole'.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
  receiving at a gateway device a first communication from a first network that is addressed for a network element of a second network, where the second network is based on a different technology than the first network and where the gateway device comprises a layer 3 gateway;
  transmitting the first communication from the gateway device to the second network;
  receiving at the gateway device a second communication from the second network that is addressed for a network element of the first network;
  transmitting the second communication from the gateway device to the first network;
  periodically polling the gateway device to obtain operating parameters related to communications between the first and second networks, the operating parameters including at least two of information identifying Internet Key Exchange security associations (IKE SAs) no longer being used, information identifying a number of toggles between an active card and a standby card in the gateway device, or information identifying processor utilization in the gateway device;
  analyzing the operating parameters; and
  generating a health report related to the stability of at least the gateway device, the health report being based upon analysis of the operating parameters.

2. The method of claim 1 where the polling of the gateway device to obtain operating parameters further comprises obtaining information related to a flowcache-and information identifying node throughput.

3. The method of claim 1 where the polling of the gateway device to obtain operating parameters comprises obtaining information identifying IKE SAs no longer being used.

4. The method of claim 1 where the polling of the gateway device to obtain operating parameters further comprises obtaining node configuration information.

5. The method of claim 4 where the node configuration information comprises a number of layer 3 connections.

6. The method of claim 5 where the node configuration information comprises a number of VPRN (virtual private routed network) connections.

7. The method of claim 5 where the node configuration information comprises a number of IPSec tunnels.

8. The method of claim 1 where the first network comprises the Internet.

9. The method of claim 8 where the second network comprises at least one of a frame relay network, an asynchronous transfer mode network, private internet protocol network or an internet protocol virtual private network.

10. The method of claim 1 where the gateway device further implements a firewall function when transmitting communications between the first and second networks.

11. The method of claim 1 where the analyzing of the operating parameters comprises comparing the operating parameters to a threshold value.

12. The method of claim 11, further comprising setting a flag if the operating parameters exceed the threshold value.

13. The method of claim 12 where the comparing of the operating parameters to a threshold value comprises comparing the operating parameters to a warning threshold value and comparing the operating parameters to an augment threshold value.

14. A method, comprising:
  receiving, at an inter-network gateway, a first communication from a first network that is addressed for a network element of a second network, where the second network is based on a different technology than the first network and wherein the inter-network gateway comprises a layer 3 gateway;
  transmitting the first communication from the inter-network gateway to the second network;
  receiving, at the inter-network gateway, a second communication from the second network that is addressed for a network element of the first network;
  transmitting the second communication from the inter-network gateway to the first network;
  periodically polling, via a network device, the inter-network gateway to collect data related to the inter-network gateway, the data including at least two of information related to a flowcache to store connection information, information identifying a number of virtual private routed networks, or information identifying a number of internet key exchange security associations (IKE SAs) not being used;
  processing, via the network device, the data to generate a number of parameters; generating, via the network device, a report based on the parameters, where the report relates to stability of the inter-network gateway; and
  automatically transmitting, via the network device, the report, the report being transmitted without human intervention.

15. The method of claim 14 where the data comprises information related to the flowcache to store connection information, information identifying a number of virtual private routed networks, and information identifying a number of IKE SAs not being used.

16. The method of claim 14 where the generating of the report comprises indicating whether any of the parameters indicate a possibility of a network instability.

17. The method of claim 16 where the generating of the report comprises generating a report that has a warning flag if a parameter exceeds a first threshold and generating a report that has an augment flag if a parameter exceeds a second threshold.

18. The method of claim 14 where the polling of the inter-network gateway to collect data related to the inter-network gateway comprises collecting data related to the flowcache.

19. The method of claim 18 where the parameters comprise statistics related to flows, predicted flows, connections, conversations and packets.

20. The method of claim 14 where the polling of the inter-network gateway to collect data related to the inter-network gateway comprises collecting data identifying the number of virtual private routed networks.

21. The method of claim 14 where the polling of the inter-network gateway to collect data related to the inter-network gateway comprises collecting data identifying the number of IKE SAs not being used.

22. The method of claim 21 where the parameters comprise a count of a number of dead IKE SAs.

23. The method of claim 14 where the polling of the inter-network gateway to collect data related to the inter-network gateway further comprises at least one of collecting data identifying a number of card toggles, identifying CPU utilization or identifying memory utilization.

24. A non-transitory computer readable memory comprising computer-executable instructions, the computer-executable instructions comprising:
computer program code to automatically, periodically poll a plurality of inter-network gateways to collect data related to the plurality of inter-network gateways, the data identifying at least two of information associated with a flowcache to store connection information, information identifying a number of virtual private routed networks, or information identifying a number of dead internet key exchange security associations;
computer program code to process the data to generate a number of parameters;
computer program code to generate a report based on the parameters, where the report relates to stability of the inter-network gateways; and
computer program code to automatically transmit the report, the report being transmitted without human intervention,
wherein a first one of the plurality of inter-network gateways is configured to:
receive a first communication from a first network that is addressed for a network element of a second network, where the second network is based on a different technology than the first network and wherein the first inter-network gateway device comprises a layer 3 gateway,
transmit the first communication from the first inter-network gateway to the second network,
receive, at the first inter-network gateway, a second communication from the second network that is addressed for a network element of the first network, and
transmit the second communication from the first inter-network gateway to the first network.

25. The non-transitory computer readable memory of claim 24 where the computer-executable instructions operate on a UNIX-based operating system.

26. The non-transitory computer readable memory of claim 24 where the computer program code to automatically, periodically poll the gateways is further to initiate a SNMP connection with each of the gateways.

27. The non-transitory computer readable memory of claim 24 where computer program code to automatically, periodically poll the gateways is further to initiate a command line interface (CLI) connection with each of the gateways.

28. The non-transitory computer readable memory of claim 24 and further comprising computer program code to write data collected from the gateways into a file.

29. The non-transitory computer readable memory of claim 28 where the computer program code to write data is further to write raw data into a raw data file and to write summary data into a summary data file.

30. The non-transitory computer readable memory of claim 24 where the computer program code to automatically transmit the report comprises computer program code to automatically transmit an ASCII file via e-mail.

31. An apparatus for use in monitoring the stability of a network, the apparatus comprising:
a processor;
a memory coupled to the processor; and
an interface mechanism coupled to the processor;
where the processor is to:
periodically poll an inter-network gateway through the interface mechanism to collect data related to the inter-network gateway, the data including at least two of information identifying a number of Internet Key Exchange security associations (IKE SAs) no longer being used, information identifying node throughput, information identifying a number of toggles between an active card and a standby card in the inter-network gateway or information identifying processor utilization in the inter-network gateway,
generate a report based on the data, where the report relates to stability of the inter-network gateway, and
cause the report to be transmitted to a remote location.

32. The apparatus of claim 31 where the data further comprises at least one of information related to at least one of a flowcache configured to store connection details, or information identifying a number of virtual private routed networks.

33. The apparatus of claim 32 where the data comprises data related to the flowcache the number of a virtual private routed networks, and the number of IKE SAs no longer being used.

34. The apparatus of claim 32 where the processor, when polling the inter-network gateway to collect data related to the inter-network gateway, is to collect data related to the flowcache.

35. The apparatus of claim 34 where the report comprises statistics related to flows, predicted flows, connections, conversations and packets.

36. The apparatus of claim 32 where the processor, when polling the inter-network gateway to collect data related to the inter-network gateway, is further to collect data related to a virtual private routed network.

37. The apparatus of claim 32 where the processor, when polling the inter-network gateway to collect data related to the inter-network gateway, is to collect data identifying the number of IKE SAs no longer being used.

38. The apparatus of claim 31 where the processor, when generating the report, is further to indicate whether any of the parameters indicate a possibility of a network instability.

39. The apparatus of claim 38 where the report comprises a warning flag when a parameter exceeds a first threshold and an augment flag when a parameter exceeds a second threshold.

* * * * *